US011757379B2

(12) United States Patent
Kovács

(10) Patent No.: US 11,757,379 B2
(45) Date of Patent: Sep. 12, 2023

(54) DEVICE FOR CONVERTING ENERGY IN THE ATMOSPHERE AND METHOD FOR MANUFACTURING THE SAME

(71) Applicant: ION-ENERGY B.V., Geleen (NL)

(72) Inventor: Sándor Kovács, Geleen (NL)

(73) Assignee: ION-ENERGY B.V., Geleen (NL)

( * ) Notice: Subject to any disclaimer, the term of this patent is extended or adjusted under 35 U.S.C. 154(b) by 417 days.

(21) Appl. No.: 17/279,309

(22) PCT Filed: Oct. 4, 2018

(86) PCT No.: PCT/EP2018/077023
§ 371 (c)(1),
(2) Date: Mar. 24, 2021

(87) PCT Pub. No.: WO2020/069746
PCT Pub. Date: Apr. 9, 2020

(65) Prior Publication Data
US 2021/0399652 A1    Dec. 23, 2021

(51) Int. Cl.
*H02N 1/06* (2006.01)
*B21B 1/38* (2006.01)
(Continued)

(52) U.S. Cl.
CPC ............ *H02N 1/06* (2013.01); *B21B 1/38* (2013.01); *B32B 5/022* (2013.01); *B32B 15/14* (2013.01);
(Continued)

(58) Field of Classification Search
CPC .. H02N 1/06; B21B 1/38; B32B 5/022; B32B 15/14; B32B 15/20; B32B 27/12;
(Continued)

(56) References Cited

U.S. PATENT DOCUMENTS

2012/0153772 A1*  6/2012  Landa ................... C23C 14/34
                                                    428/221
2014/0127566 A1    5/2014  Kuriki et al.
(Continued)

FOREIGN PATENT DOCUMENTS

CA    2678756 A1    12/2009
JP    11297578 A    10/1999
(Continued)

OTHER PUBLICATIONS

Japanese Office Action dated Jun. 21, 2022 for copending Application No. 2021-543555.
(Continued)

*Primary Examiner* — Thomas Truong
(74) *Attorney, Agent, or Firm* — Hudak, Shunk & Farine Co. LPA

(57) ABSTRACT

A device for converting electrical energy from electrically charged particles, which includes a positive electrode, the positive electrode includes a composition arranged in a plate shape, the composition includes a binding agent and a filler, wherein the filler is dispersed through the binding agent, and the filler includes at least titanium dioxide and activated carbon particles. The device further includes a negative electrode, arranged in a plate shape, the negative electrode includes a metal alloy, wherein the metal alloy includes aluminium, and magnesium. The device further includes a gas permeable insulator. The positive electrode, the gas permeable insulator and the negative electrode are stacked into a laminated structure. The gas permeable insulator is arranged as an intermediate layer between the positive electrode and the negative electrode.

20 Claims, 2 Drawing Sheets

(51) Int. Cl.
  *B32B 5/02* (2006.01)
  *B32B 15/14* (2006.01)
  *B32B 15/20* (2006.01)
  *B32B 27/12* (2006.01)
  *B32B 27/20* (2006.01)
  *B32B 27/38* (2006.01)

(52) U.S. Cl.
  CPC .............. *B32B 15/20* (2013.01); *B32B 27/12* (2013.01); *B32B 27/20* (2013.01); *B32B 27/38* (2013.01); *B32B 2262/02* (2013.01); *B32B 2264/1022* (2020.08); *B32B 2264/302* (2020.08); *B32B 2307/724* (2013.01); *B32B 2457/00* (2013.01)

(58) Field of Classification Search
  CPC ..... B32B 27/20; B32B 27/38; B32B 2262/02; B32B 2264/1022; B32B 2264/302; B32B 2307/724; B32B 2457/00; Y02E 10/50; H02S 99/00
  See application file for complete search history.

(56) References Cited

U.S. PATENT DOCUMENTS

2014/0210308 A1  7/2014  McCowen
2014/0292140 A1* 10/2014  Carmein .................. H02P 9/00
                                                              310/309

FOREIGN PATENT DOCUMENTS

| JP | H11297578 A  | 10/1999 |
| JP | 200718760 A  | 1/2007  |
| JP | 2009528014 A | 7/2009  |
| JP | 2014112534 A | 11/2012 |
| JP | 2016060887 A | 4/2016  |

OTHER PUBLICATIONS

Korean Office Action for family member application No. 2021-7012285 dated May 10, 2023.

* cited by examiner

DEVICE FOR CONVERTING ENERGY IN THE ATMOSPHERE AND METHOD FOR MANUFACTURING THE SAME

FIELD OF THE INVENTION

The invention relates to a device for generating electrical energy and a method for manufacturing the device.

BACKGROUND OF THE INVENTION

While fossil energy sources such as oil and gas are rapidly being depleted, and the demand for renewable clean energy is growing worldwide, new technologies for generating energy appear. An example such a technology is the conversion of solar energy to electricity wherein solar radiation is converted into electrical energy using photovoltaic conversion.

Solar radiation energy is not the only renewable source of energy. Electrically charged particles are abundant in the earth atmosphere which provide an unlimited source of energy. It is known that such energy may be harvested using copper wires which may be suspended in the atmosphere and which capture the electrically charged particles. The suspended copper wires exhibit accumulation of an electrical charge, which may be measured electrically e.g. using a voltmeter. No useful application of this electrical charge has been recorded however, such as utilization of the electrical charge for powering electrical appliances.

It is known from Chalmers, J. Alan, Atmospheric Electricity, Pergamon Press, London (1957), that positive electrical charge in the form of positive charged particles, which are generated by solar radiation and/or radioactivity may be suspended in the earth atmosphere. Free electrons arising from this process of generating positive charged particles are diverted to the earth by for example thunderstorms. The earth is subsequently negatively charged relative to the earth atmosphere. The positively charged particles may be collected using for example conductive wires suspended above ground. Such conductive wires may be made from copper.

A problem associated with converting the electrically charged particles using the known copper wires is the susceptibility of the copper conductors' surface. Normal copper wires having untreated surface which do not allow the particles to be captured efficiently and therefore charge up slowly. The captured particles convert their energy in electrical charge, however to the slow, inefficient capturing of these particles, the thus harvested electrical energy cannot be efficiently utilized. Alternative materials for the suspended conductors such as wires containing activated carbon particles such as graphite may be utilized, as shown for example in US published patent application number 2014210308.

Document CA2678756 A1 further discloses a capacitor storing electrical energy from the air and ground.

SUMMARY OF THE INVENTION

It is an object of the invention to provide a method for manufacturing a device for energy converting and the device having improved susceptibility of electrically charged particles and an improved energy conversion rate.

The object is achieved in a device for converting electrical energy from electrically charged particles.

The device for converting electrical energy from electrically charged particles, comprises a positive electrode, the positive electrode comprises a composition arranged in a plate shape, the composition comprises a binding agent and a filler, wherein the filler is dispersed through the binding agent, and the filler comprises at least titanium dioxide and activated carbon particles.

The device further comprises a negative electrode, arranged in a plate shape, the negative electrode comprises a metal alloy, wherein the metal alloy comprises aluminium and magnesium.

The positive electrode and negative electrode are plate shaped. The positive and negative electrodes have a mutually corresponding structure. The positive and negative electrodes may be flat. In other examples the positive and negative electrodes may have a corrugated structure, cylindrical, or folded structure, and the like.

The device further comprises a gas permeable insulator.

The positive electrode, the gas permeable insulator and the negative electrode are stacked into a laminated structure. The gas permeable insulator is arranged as an intermediate layer between the positive electrode and the negative electrode.

The insulated positive electrode is capable of capturing positively charged particles from the earth's atmosphere. When captured the particles are recombined with electrons from the positive electrode. The positive electrode is thereby positively charged. When connected to a load, electrical energy is available as a voltage and electrical current which can be drained from the negative and positive electrode. The thus harvested electrical energy can be used in at least one of an electrical load such as a resistive load, or optionally stored in a storage such as a chargeable battery, and subsequently used in electrical appliances.

In an embodiment, the plate shaped positive electrode is laterally electrostatically polarized in a polarization direction, and the metal alloy is rolled in a rolling direction, and the positive electrode is arranged relative to the negative electrode having the polarization direction of the positive transverse to the rolling direction of the negative electrode.

This significantly increases the efficiency of capturing the charged particles by the positive electrode, resulting in an increased output voltage.

In an embodiment, the binding agent comprises a thermohardening resin, wherein the resin has been hardened by curing the resin using an associated catalyst.

In an embodiment, the thermohardening resin comprises epoxy.

In an embodiment, the filler has a grain size less than 500 nm.

In an embodiment, the gas permeable insulator comprises a layer of a nonwoven fabric of synthetic material.

This allows contact of the positive and negative electrode with the earth's atmosphere via the gas permeable insulator.

In an embodiment, the metal alloy further comprises at least one of manganese, copper, zinc and silicon.

This allows a higher voltage to be achieved.

The object is further achieved in a system for converting electrical energy from electrically charged particles. The system comprises a device for converting electrical energy from electrically charged particles as described above, wherein the positive electrode is directed to the earth atmosphere with a surface opposite of the gas permeable insulator, and wherein the negative electrode is connected to ground.

By connecting to the ground, the negative electrode assumes the earth potential which is negative relative to the earth atmosphere. This way positively charged particles from the atmosphere are attracted to the negative electrode, Subsequently the positively charged particles are captured by the positive electrode with the surface facing the earth atmosphere, which surface is opposite of the surface facing the gas permeable insulator.

By connecting the positive electrode and the negative electrode to an electrical load such as a resistor, an electrical current will result through the load, wherein electrons from the negative electrode will neutralize the captured positively charged particles in the positive electrode.

The object is further achieved in a method of manufacturing a device for converting electrical energy from electrically charged particles.

The method comprises manufacturing a positive electrode. The manufacturing a positive electrode comprises mixing a binding agent and a filler into a composition, wherein the filler is dispersed through the binding agent. The binding agent comprises a resin, and the filler comprises at least titanium dioxide and activated carbon particles.

The composition is cast into a mold for forming the positive electrode. The mold is arranged for forming the positive electrode into a plate shape comprising the composition. The composition is hardened by curing with a catalyst. The composition may be subsequently cooled.

The method further comprises manufacturing a negative electrode, comprising preparing a metal alloy bar wherein the metal alloy comprises aluminium and magnesium.

The method further comprises providing a gas permeable insulator.

The method further comprises stacking the positive electrode, the gas permeable insulator and the negative electrode in a laminated structure, wherein the stacking comprises arranging the gas permeable insulator as an intermediate layer between the positive electrode and the negative electrode.

In an embodiment, the manufacturing a positive electrode further comprises electrostatically polarizing the plate comprising the composition in a polarization direction, wherein the polarization direction is in a lateral direction of the plate, and the manufacturing a negative electrode further comprises rolling the metal alloy bar into a metal alloy plate in a single rolling direction to obtain the negative electrode and the stacking the positive electrode, the gas permeable insulator and the negative electrode in a laminated structure further comprises arranging the positive electrode and the negative electrode relative to each other to have the polarization direction of the positive electrode transverse to the rolling direction of the negative electrode.

This improves capturing of the positively charged particles and thereby increases the output voltage of the device.

In an embodiment, the resin comprises a thermohardening resin and an associated catalyst, wherein the hardening of the positive electrode comprises curing the resin using the catalyst.

In an embodiment, the resin comprises epoxy.

In an embodiment, the filler is ground to a grain size less than 500 nm.

In an embodiment, the gas permeable insulator comprises a layer of nonwoven fabric of synthetic material.

The non-woven fabric allows access of the air from the earth's atmosphere between the positive and negative electrode.

In an embodiment, the synthetic material comprises polyester.

In an embodiment, the method further comprises cooling the composition after the hardening of the composition, and wherein the electrostatically polarizing is performed during the cooling of the composition.

DETAILED DESCRIPTION OF EMBODIMENTS

Figure 1:
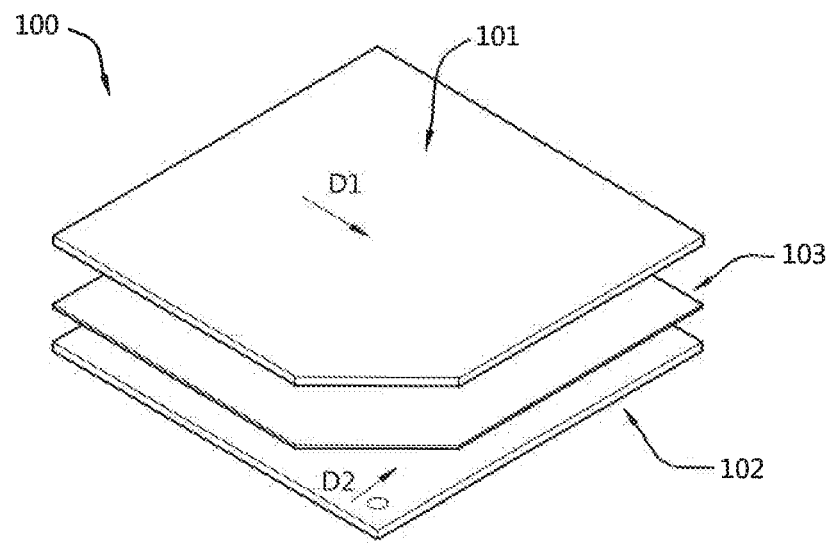
FIG. 1 shows a device for converting electrical energy from electrically charged particles according to an embodiment of the invention.

In FIG. 1 an example of a device 100 for converting electrical energy is shown. The device 100 comprises a stack of a positive electrode 102, a gas permeable insulator 103 and a negative electrode 101.

The positive electrode 102 is manufactured from a thermohardening resin as a binding agent, and a filler. The thermohardening resin can be epoxy, which is curable by an appropriate hardener as will be known to the person skilled in the art. The filler comprises titanium dioxide. The filler further comprises activated carbon particles. The filler is ground to titanium dioxide particles and activated carbon particles having a grain size of less than 500 micrometer. The activated carbon particles are manufactured from carbon particles which are subjected to pyrolysis in a temperature range of 600-900° C. The ground activated carbon particles obtain a fractal like shape during the pyrolysis. This allows improved capture of charged particles from the earth atmosphere, As is shown in for example for example in US published patent application number 2014210308, that carbon particles provide a pointy conductive surface, and thereby improve capture of electrical energy. The fractal structure of the activated carbon improves this effect further.

After grinding the filler is dispersed through the epoxy resin into a mixture. To this mixture the hardener is added. The epoxy with filler and hardener is cast into a mold where it is cured. The curing takes place at a temperature of at least 150° C.

The mold is shaped to allow the production of a plate shaped positive electrode 102. After the curing, the positive electrode 102 can be subjected to an electric field of at least 200 kV/m in lateral direction, further referred to as polarization direction D2, while cooling the positive electrode after the curing, to allow the titanium dioxide particle to settle in a polarized position within the epoxy resin. The ground activated carbon particles also provide conductivity for the positive electrode 102.

The polarized positive electrode 102 is removed from the mold after the cooling. In order to facilitate the removal of the positive electrode 102 from the mold, a waxing agent may be applied within the mold. Alternatively, a waxing agent may be mixed with the resin prior to curing.

In an example of an positive electrode of 3 mm in thickness, the titanium dioxide having a grain size of 0.3 micrometer content may be in a range of 100-200 gr/dm$^2$.

Furthermore, in the same example, the activated coal content may be in a range of 100-200 mg/dm$^2$.

The negative electrode 101 is manufactured from a metal alloy comprising aluminium and magnesium. In addition to the aluminium and magnesium, zinc, manganese, copper may be added. The metal alloy may further comprise silicon.

An exemplary composition of the metal alloy having all ingredients is shown in table 1 below, wherein for each element a range for its relative content in weight percentage (WT %).

The skilled person will recognize that further ingredients or elements may be added to the metal alloy.

| Element | WT % range |
| --- | --- |
| Aluminium | 90-98 |
| Magnesium | 0.2-1.5 |
| Manganese | 0.1-0.3 |
| Copper | 0.2-0.6 |
| Zinc | 0.1-0.5 |
| Silicon | 0.7-1.7 |

Table 1, preferred metal alloy composition in WT % for each element

A bar of the metal alloy can be rolled into a single direction D1 to obtain a sheet of metal alloy. The negative electrode 101 can be cut from the sheet of metal alloy.

The gas permeable insulator 103 can be formed by a gas permeable sheet of synthetic material. The sheet of synthetic material is permeable to gas. The gas can be air. The sheet synthetic material is preferably manufactured from a non-woven sheet of synthetic fabric such as polyester.

The negative electrode 101, positive electrode 102 and gas permeable insulator 103 are stacked and subsequently compressed, to form the device 100. The polarization direction D2 and rolling direction D1 can be chosen transverse to each other as shown in FIG. 1.

In an exemplary embodiment, the positive electrode 102, negative electrode 101 and gas permeable insulator 103 have a size of 10 cm by 10 cm, however other sizes may be contemplated. The larger the size the higher the current capacity of the device, i.e. the more current can be drawn from the device 100.

A plurality of devices 100 may be connected in series, wherein a negative electrode 101 of a first device is connected to the positive electrode 102 of a second device, and wherein the output voltage is determined by the total voltage measured between the positive electrode 102 of the first device 100 and the negative electrode 101 of the second device 100, to increase its output voltage.

A plurality of devices 100 for converting electrical energy can also be stacked in a stacking direction, wherein each of the plurality of devices 100 is connected in series in the stacking direction. This allows a higher voltage to be achieved as the stacked devices form a series connection of devices wherein voltages of each individual device may be added up.

Moreover, a plurality of devices 100 may be connected in parallel, wherein the negative electrodes 101 of each of the plurality of devices 100 are interconnected, and wherein the positive electrodes 102 of each of the plurality of devices 100 are interconnected. This will increase the current capacity of the devices 100 connected in parallel proportional with the number of interconnected devices 100.

The person skilled in the art will recognize that configurations of parallel and series connected devices 100 may be contemplated.

Figure 2:
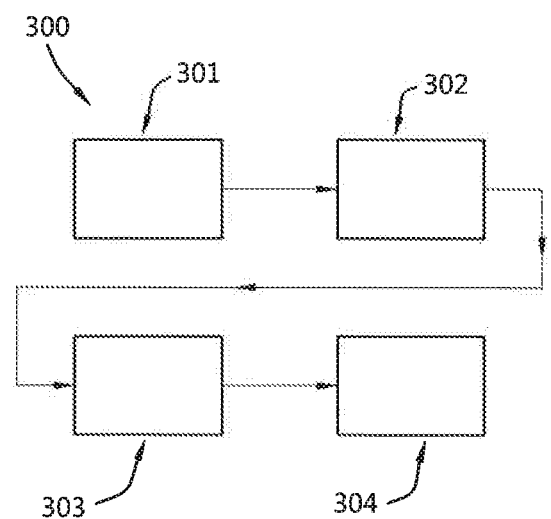
FIG. 2 shows a block diagram of a method of manufacturing a device for converting electrical energy according to an embodiment of the invention according to an embodiment of the invention.

In FIG. 2 a block diagram is shown of a method 300 for manufacturing the device 100 for converting electrical energy.

In step 301, a positive electrode 102 is manufactured, in step 302 a negative electrode 101 is manufactured.

The positive electrode 102 is manufactured in step 301 by mixing a resin, as a binding agent, and titanium dioxide and activated carbon particles as filler into a composition. The resin is preferably a thermohardening resin. More preferably the resin is epoxy.

The titanium dioxide and activated carbon particles are ground to a grain size of less than 500 nm. During the mixing, the filler is dispersed throughout the resin. The resulting composition is then mixed with a hardener. For epoxy the hardener may be one of the non-conclusive list comprising a primary amine, a cyclic anhydride, a polyphenol and a thiol. Preferably the hardener comprises a cyclic chemical structure.

The composition is then cast into a mold for forming the positive electrode 102, wherein the mold is arranged for forming the positive electrode 102 into a plate comprising the composition. The composition is thermohardened in the mold to form the plate. While hardening the positive electrode 102 is electrostatically polarized by applying an electrical field as described.

The negative electrode 101 is prepared in step 302 by preparing a metal alloy having the metals and silicon as described above. The metals and silicon are melted together and cast into a mold for forming a bar. The metal in the mold is subsequently cooled. The metal alloy bar is rolled into a metal alloy plate in a single rolling direction. The rolled metal alloy plate is then cut to obtain the negative electrode 102 from the metal alloy plate.

The positive electrode 102, gas permeable insulator 103 and negative electrode 101 are stacked. When stacking, the positive electrode 102 and negative electrode 101 can be positioned relative to each other having the polarization direction D2 of the positive electrode in a direction transverse of the rolling direction D1 of the negative electrode 101.

The device 100 as shown in FIG. 1 is shown is made from a flat shaped stacked positive electrode 102, negative electrode 101 and gas permeable insulator 103. The device 100 may alternative be manufactured in a curved shaped laminated manner, wherein the positive electrode, negative electrode and gas permeable insulator have corresponding curvature or curved plate shape allowing these parts to be stacked and compressed.

In step 303 a gas permeable insulator 103 comprising a sheet of non-woven synthetic material is provided.

The steps 301-303 may be performed in random order.

In step 304 the positive electrode 102, gas permeable insulator 103 and negative electrode 101 are stacked.

Figure 3:
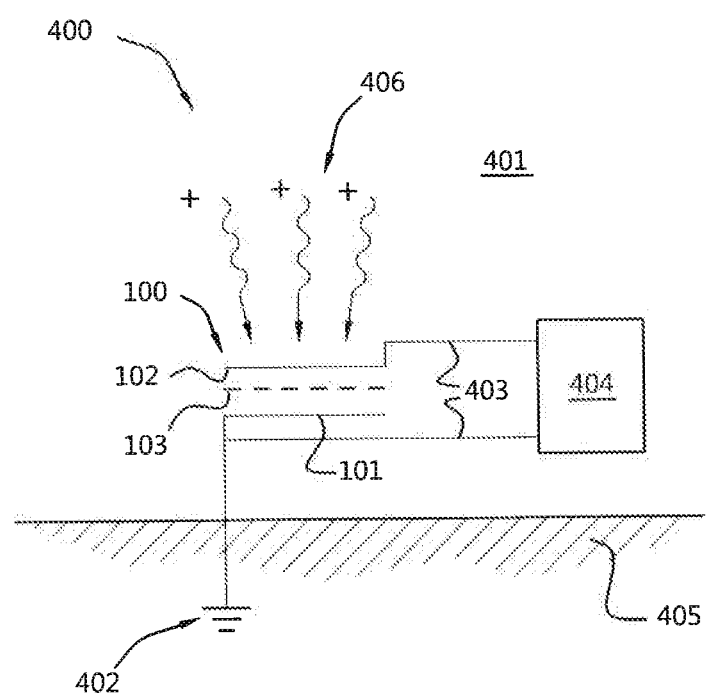
FIG. 3 shows a schematic representation of a system for converting electrical energy from electrically charged particles according to an embodiment of the invention

In FIG. 3 a system 400 for converting electrical energy from electrically charged particles is shown schematically having the device 100 as described above. The negative electrode 101 is connected to ground 405. This can be performed for example by using a ground electrode 402. The negative electrode 101 will be negatively charged relative to the earth atmosphere 401

The positive electrode 102 facing the earth atmosphere 401 will attract positively charged particles 406 from the earth atmosphere 401 which can be subsequently captured by the positive electrode 102. The positive charged particles 406 are neutralized by electrons in the positive electrode 102 which becomes thereby positively charged. The charge difference between the negatively charged negative electrode 101 and positively charged positive electrode 102 can be transferred to an electrical load 404 using conductive leads 403. The electrical load 404 can for example be at least one of a resistive load, an electrical power converter, and an electrical storage such as a chargeable battery. By using an electrical power converter, the captured electrical energy can be utilized for powering electrical devices or appliances at voltages different from the accumulated voltage difference between positive electrode 102 and negative electrode 101.

It will be clear to a person skilled in the art that the scope of the present invention is not limited to the examples discussed in the foregoing but that several amendments and modifications thereof are possible without deviating from the scope of the present invention as defined by the attached claims. In particular, combinations of specific features of various aspects of the invention may be made. An aspect of the invention may be further advantageously enhanced by adding a feature that was described in relation to another aspect of the invention. While the present invention has been illustrated and described in detail in the figures and the description, such illustration and description are to be considered illustrative or exemplary only, and not restrictive.

The present invention is not limited to the disclosed embodiments. Variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. The mere fact that certain measures are recited in mutually different dependent claims does not indicate that a combination of these measures cannot be used to advantage. Any reference numerals in the claims should not be construed as limiting the scope of the present invention.

REFERENCE NUMERALS

| | |
|---|---|
| 100 | Device for converting electrical energy from electrically charged particles |
| 101 | Negative electrode |
| 102 | Positive electrode |
| 103 | Gas permeable Insulator |
| D1 | Negative electrode rolling direction |
| D2 | Positive electrode polarization direction |
| 300 | Method of manufacturing a device for converting electrical energy |
| 301 | Manufacturing a positive electrode |
| 302 | Manufacturing a negative electrode |
| 303 | providing a sheet of insulating material |
| 304 | stacking the positive electrode, the gas permeable insulator and the negative electrode in a laminated structure |
| 400 | System for converting electrical energy from electrically charged particles |
| 401 | Earth atmosphere |
| 402 | Ground electrode |
| 403 | Conductive leads |
| 404 | Electrical load |
| 405 | Ground |
| 406 | Positively charged particles |

The invention claimed is:

1. A device for converting electrical energy from electrically charged particles in the earth atmosphere, comprising:
   a positive electrode, the positive electrode comprising a composition arranged in a plate shape, the composition comprising a binding agent and a filler, wherein the filler is dispersed through the binding agent, and the filler comprises at least titanium dioxide particles and activated carbon particles, and wherein the positive electrode is arranged to face the earth atmosphere to attract positively charged particles from the earth atmosphere which can be subsequently captured by the positive electrode;
   a negative electrode, arranged in a plate shape, the negative electrode comprising a metal alloy, wherein the metal alloy comprises aluminium and magnesium;
   a gas permeable insulator; wherein the positive electrode, the gas permeable insulator and the negative electrode are stacked into a laminated structure, and wherein the gas permeable insulator is arranged as an intermediate layer between the positive electrode and the negative electrode.

2. The device according to claim 1, wherein the plate shaped positive electrode is laterally electrostatically polarized in a polarization direction (D2); and wherein the metal alloy of the negative electrode is rolled in a rolling direction (D1); and wherein the positive electrode is arranged relative to the negative electrode having the polarization direction (D2) of the positive electrode transverse to the rolling direction (D1) of the negative electrode.

3. The device according to claim 2, wherein the binding agent comprises a thermohardening resin, preferably epoxy, wherein the resin has been hardened using an associated catalyst, and wherein the filler particles have a grain size less than 500 nm.

4. The device according to claim 3, wherein the gas permeable insulator comprises a layer of a nonwoven fabric of synthetic material, and wherein the metal alloy further comprises at least one of manganese, copper, zinc and silicon.

5. A system for converting electrical energy from electrically charged particles, the system comprising the device for converting electrical energy from electrically charged particles according to claim 4, wherein the positive electrode is directed to the earth atmosphere with a surface opposite of the gas permeable insulator, and wherein the negative electrode is connected to ground.

6. The device according to claim 1, wherein the binding agent comprises a thermohardening resin, preferably epoxy, wherein the resin has been hardened using an associated catalyst.

7. The device according to claim 1, wherein the filler particles have a grain size less than 500 nm.

8. The device according to claim 1, wherein the gas permeable insulator comprises a layer of a nonwoven fabric of synthetic material.

9. The device according to claim 1, wherein the metal alloy further comprises at least one of manganese, copper, zinc and silicon.

10. A system for converting electrical energy from electrically charged particles, the system comprising the device for converting electrical energy from electrically charged particles according to claim 1, wherein the positive electrode is directed to the earth atmosphere with a surface opposite of the gas permeable insulator, and wherein the negative electrode is connected to ground.

11. A method of manufacturing a device for converting electrical energy from electrically charged particles from the earth atmosphere, comprising:
   manufacturing a positive electrode that is arranged to face the earth atmosphere to attract positively charged particles from the earth atmosphere which can be subsequently captured by the positive electrode, comprising;
   mixing a binding agent and a filler into a composition, wherein the filler is dispersed through the binding agent, wherein the
   binding agent comprises resin, and wherein the filler comprises at least titanium dioxide and activated carbon particles;

casting the composition into a mold for forming the positive electrode, wherein the mold is arranged for forming the positive electrode into a plate shape comprising the composition;

hardening the composition;

manufacturing a negative electrode, comprising preparing a metal alloy bar wherein the metal alloy comprises aluminium and magnesium;

providing a gas permeable insulator; and stacking the positive electrode, the gas permeable insulator and the negative electrode in a laminated structure, wherein the stacking comprises arranging the gas permeable insulator as an intermediate layer between the positive electrode and the negative electrode.

12. The method according to claim 11, wherein the manufacturing a positive electrode further comprises electrostatically polarizing the plate comprising the composition in a polarization direction, wherein the polarization direction is in a lateral direction of the plate; and wherein the manufacturing a negative electrode, further comprises rolling the metal alloy bar into a metal alloy plate in a single rolling direction to obtain the negative electrode; and wherein the stacking the positive electrode, the gas permeable insulator and the negative electrode in a laminated structure further comprises arranging the positive electrode and the negative electrode relative to each other to have the polarization direction (D2) of the positive electrode transverse to the rolling direction (D1) of the negative electrode.

13. The method according to claim 12, further comprising:

a. cooling the composition of the positive electrode after the hardening of the composition, and performing the electrostatically polarizing the positive electrode during the cooling of the composition.

14. The method according to claim 12, wherein the binding agent comprises a thermohardening resin, and wherein the hardening of the positive electrode comprises curing the thermohardening resin using an associated catalyst, wherein the thermohardening resin comprises epoxy, and wherein the filler is ground to a grain size less than 500 nm.

15. The method according to claim 14, wherein the gas permeable insulator comprises a layer of nonwoven fabric of synthetic material, wherein the method further comprises cooling the composition of the positive electrode after the hardening of the composition, and performing the electrostatically polarizing the positive electrode during the cooling of the composition, and wherein the metal alloy further comprises at least one of manganese, copper zinc and silicon.

16. The method according to claim 11, wherein the binding agent comprises a thermohardening resin, and wherein the hardening of the positive electrode comprises curing the thermohardening resin using an associated catalyst.

17. The method according to claim 16, wherein the thermohardening resin comprises epoxy.

18. The method according to claim 11, wherein the filler is ground to a grain size less than 500 nm.

19. The method according to claim 11, wherein the gas permeable insulator comprises a layer of nonwoven fabric of synthetic material.

20. The method according to claim 11, wherein the metal alloy further comprises at least one of manganese, copper zinc and silicon.

* * * * *